(12) United States Patent
Waldrop et al.

(10) Patent No.: US 6,286,316 B1
(45) Date of Patent: Sep. 11, 2001

(54) SYSTEM FOR RECOVERING AND UTILIZING VAPOR

(75) Inventors: Richard Waldrop, Kinnelon; Gerald R. Harlan, Cedar Grove; Joseph C. Ponzo, Hewitt, all of NJ (US)

(73) Assignee: Edwards Engineering Corp., Pompton Plains, NJ (US)

( * ) Notice: Subject to any disclaimer, the term of this patent is extended or adjusted under 35 U.S.C. 154(b) by 0 days.

(21) Appl. No.: 09/216,764

(22) Filed: Dec. 21, 1998

(51) Int. Cl.$^7$ .................................................. F01K 13/02
(52) U.S. Cl. ................................. 60/660; 60/659; 60/670
(58) Field of Search .............................. 60/643, 653, 659, 60/650, 660, 670

(56) References Cited

U.S. PATENT DOCUMENTS

| | | | |
|---|---|---|---|
| 4,027,495 | * | 6/1977 | Edwards ..................................... 62/54 |
| 4,077,789 | * | 3/1978 | Edwards ..................................... 62/54 |
| 4,475,343 | * | 10/1984 | Debelius et al. .................... 60/682 X |
| 5,291,738 | * | 3/1994 | Waldrop .................................... 62/36 |
| 5,694,772 | * | 12/1997 | Weinberg et al. .................. 60/641.2 |
| 5,873,250 | * | 2/1999 | Lewis et al. ........................ 60/682 X |

* cited by examiner

Primary Examiner—Hoang Nguyen

(57) ABSTRACT

A system for recovering and utilizing vapor from a source of vapor has a vapor holder for storing a quantity of vapor from the source of vapor. Also included is a condenser coupled to the vapor holder for receiving and condensing at least partially, vapor from the vapor holder. The system also has an engine and a generator driven by the engine for generating electrical power. The engine has an engine intake coupled to the condenser and an exhaust outlet. This engine is powered at least partially, by output from the condensing apparatus. The system also has a fuel adjustment apparatus and a fuel sensor apparatus. The fuel adjustment apparatus has a control input and is coupled between the engine and the condensing apparatus for adjusting fuel concentration into the engine intake in response to a signal on the control input. The fuel sensor apparatus is coupled to the engine intake (a) for sensing concentration of at least some constituents of vapor at the engine intake, and (b) for applying a signal to the control input of the fuel adjustment apparatus corresponding thereto. The system also includes an exhaust sensor apparatus coupled to the exhaust outlet for providing an exhaust signal signifying concentration of at least some constituents of the exhaust at the exhaust outlet.

37 Claims, 3 Drawing Sheets

SYSTEM FOR RECOVERING AND UTILIZING VAPOR

BACKGROUND OF THE INVENTION

1. Field of the Invention

The present invention relates to vapor recovery apparatus and, in particular, to using recovered vapor for power generation.

2. Description of Related Art

Since the passage of the Clean Air Act, the Congress of the United States has required all persons or organizations handling hydrocarbons or chemicals whose vapors may pollute the air to install means to recover and prevent the contamination of the air by such vapors. Such contaminants can include vapors of gasoline, methylene chloride and other organic compounds.

Such vapors are generated and displaced into the atmosphere when all types of tanks are filled with liquid hydrocarbons or liquid chemicals. Such tanks may be large storage tanks, railroad car tanks, truck tanks, underground storage tanks for gasoline stations and fuel tanks on trucks, buses and automobiles. When these various types of tanks are filled with liquid hydrocarbons or liquid chemicals, vapors escape into the atmosphere and, as is well known, such vapors become a source of smog, which under certain ambient conditions produce dangerous fog conditions and so pollute the atmosphere that they produce dangerous environmental health hazards for human beings.

Known vapor recovery systems have used closed refrigeration cycles to cool a medium that is then used to condense vapors. Condensate can be drained to a decanter to separate heavy and light constituents, such as gasoline and water. The condensing coils for such units are periodically warmed or defrosted to prevent a build up of ice and frost that may block the passage of vapors through the condensing unit. See for example, U.S. Pat. Nos. 4,027,495; 4,068,710; 4,077,789; and 5,291,738.

Such recovery units are typically designed to handle the peak flow of vapors that may be experienced during a course of a work day. To accommodate the peak load, the recovery units are engineered with a relatively high capacity, which still may not be sufficient condense highly volatile vapors.

A disadvantage with vapor recovery systems is the energy required to run these recovery systems. Moreover, certain highly volatile vapors can only be condensed after a high expenditure of energy. Accordingly, the environmental benefits of performing vapor recovery is partially offset by the additional energy consumed to run the recovery systems.

Many industries are economically dependent on inexpensive and abundant electrical power. Many utilities will charge a rate that depends upon the peak usage or the time when the peak usage occurs. For this reason, some industries have invested in cogeneration, wherein a modest private plant for generating electricity will supplement the power from a utility to reduce the peak demand and thereby reduce the rate charged for power. Depending upon the size of the plant, some cogeneration systems can actually return power to the utility lines to earn a credit.

While in principal, a cogeneration plant can be powered by the uncondensed vapor from a vapor recovery unit, the supply of vapor tends to be sporadic and will lack a constancy that will allow cogeneration to occur in a practical way.

Such a cogeneration system may employ a generator driven by an engine that is designed to be powered by a fossil fuel. When the engine is an internal combustion engine, regulating the air/fuel ratio can be difficult when the fuel source is the uncondensed vapor from a vapor recovery unit. The uncondensed vapor can include a variety of vapors whose constituent components cannot be known in advance. Therefore, regulating the speed and power of the engine can be difficult, when the nature of the fuel, and the fuel to air ratio may vary significantly.

Furthermore, one cannot be certain in advance that the combination of a vapor recovery unit and cogeneration system will succeed in providing a net environmental benefit. In particular, the engine exhaust may introduce significant pollutants that should not be exhausted to the atmosphere.

Accordingly, there is a need to recover vapors using a combination of effective techniques such as condensing vapors, as well as using those vapors that were not condensed, in a power generation system.

SUMMARY OF THE INVENTION

In accordance with the illustrative embodiments demonstrating features and advantages of the present invention, there is provided a system for recovering and utilizing vapor from a source of vapor. The system has a vapor holder for storing a quantity of vapor from the source of vapor. Also included is a condensing means coupled to the vapor holder for receiving and condensing at least partially, vapor from the vapor holder. The system also has an engine, and a generator driven by the engine for generating electrical power. The engine has an engine intake coupled to the condensing means and an exhaust outlet. This engine is powered at least partially, by output from the condensing means.

In accordance with another aspect of the invention, a system for recovering and utilizing vapor from a source of vapor includes a condensing means for receiving and condensing at least partially, vapor from the source of vapor. Also included is an engine having an engine intake coupled to the condensing means, as well as a generator driven by the engine for generating electrical power. The engine is powered at least partially, by output from the condensing means. The system also has a fuel adjustment means and a fuel sensor means. The fuel adjustment means has a control input and is coupled between the engine and the condensing means for adjusting fuel concentration into the engine intake in response to a signal on the control input. The fuel sensor means is coupled to the engine intake (a) for sensing concentration of at least some constituents of vapor at the engine intake, and (b) for applying a signal to the control input of the fuel adjustment means corresponding thereto.

In accordance with still another aspect of the invention, a system for recovering and utilizing vapor from a source of vapor, has a condensing means for receiving and condensing at least partially, vapor from the source of vapor. Also included is an engine coupled to the condensing means and having an exhaust outlet for conducting exhaust from the engine. The engine is powered at least partially by output from the condensing means and drives a generator for generating electrical power. The system also includes an exhaust sensor means coupled to the exhaust outlet for providing an exhaust signal signifying concentration of at least some constituents of the exhaust at the exhaust outlet.

By employing systems of the foregoing type, vapor can be effectively recovered and utilized. In a preferred embodiment, vapor can be stored in a vapor holder, which is a vessel fitted with a flexible membrane or bag that can accommodate the varying volume of vapor to be stored. Consequently, the vapor can then be delivered at a relatively constant rate. Preferably, any engine driven by the vapor can be started or stopped should the supply in the vapor holder become relatively high or low.

In any event, the vapor can be preferably passed through a pre-cooler and a finishing condenser, both containing coils that conduct a refrigerant. Vapors condensed in these two units can be delivered to a decanter that can separate water from other more volatile liquids.

Vapors that were not condensed either because of their high volatility or because of an inadequate capacity to condense, may in the preferred embodiment, be re-heated and passed through a flame arrester to an electrical power generation system. These incoming vapors can be blended with air by means of a preferred modulating valve that is controlled by a fuel sensor, to establish a proper air/fuel ratio. The preferred fuel sensor employs an infrared detector tuned to sense concentration of a particular hydrocarbon, such as butane. The engine can drive a preferred induction generator to return power to utility lines.

Preferably, the engine exhaust can be sampled, cooled by a radiator, and delivered to a continuous emissions monitor. This monitor can have an infrared sensor tuned to a specific hydrocarbon, such as propane.

The preferred system is integrated by linking the engine coolant system to a thermal transfer system employing a vessel filled with a heated medium. The medium heated by the engine coolant system can be circulated to perform a variety of tasks. For example, the medium can be used to defrost the pre-cooler and finishing condenser, as well as the decanter. Also, the medium can be used to re-heat the uncondensed vapors delivered from the finishing condenser to the engine.

Also in the preferred embodiment, various operating parameters can be measured and provided as inputs to a programmable logic controller. This controller can use some of the input signals as feedback for controlling the system components. In other cases, the controller will simply record the parameters to keep a record of system performance.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein.

DETAILED DESCRIPTION OF THE PREFERRED EMBODIMENTS

Figure 2:
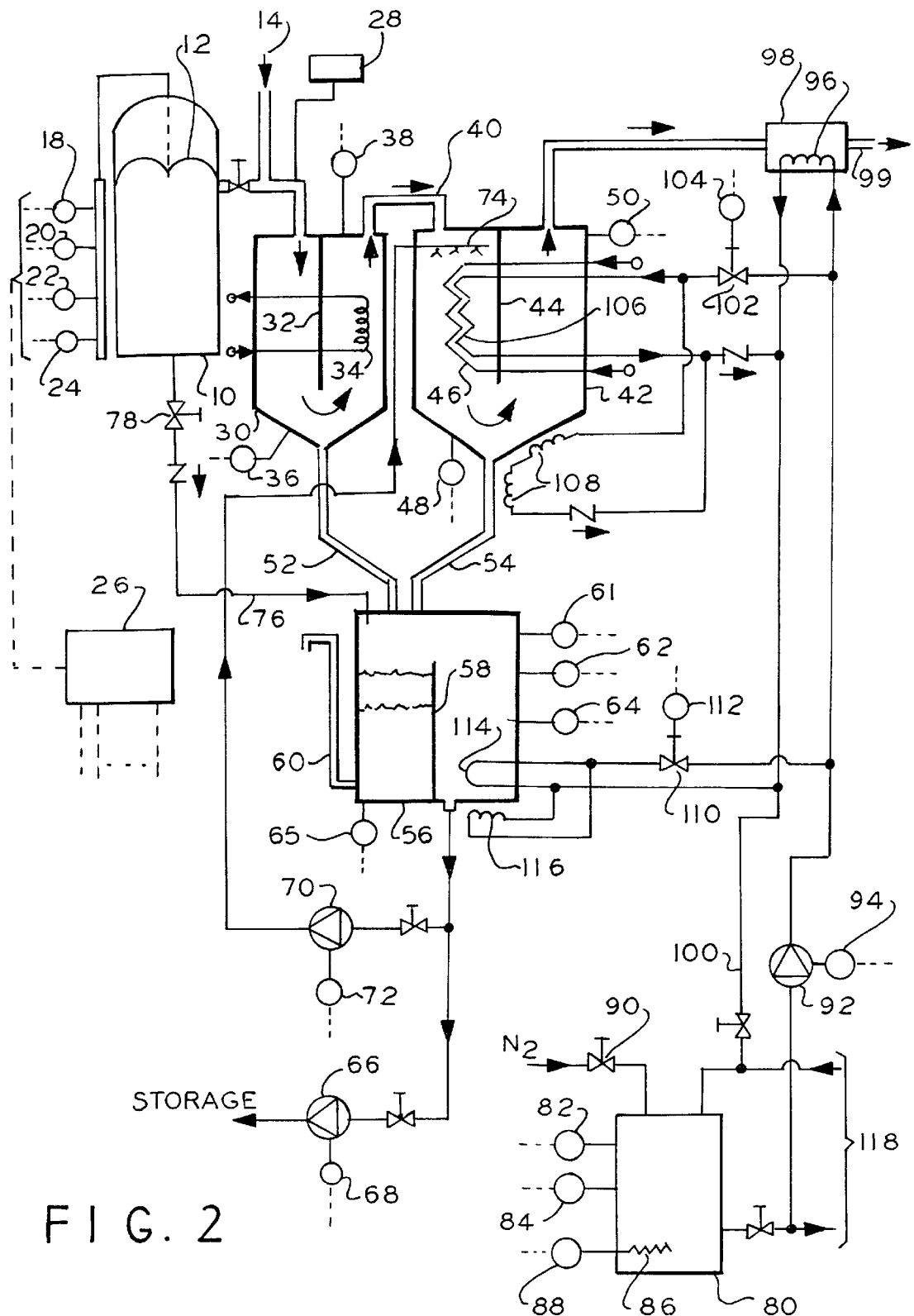
FIG. 2 is a schematic diagram of the vapor recovery portion of the system of FIG. 1.

Referring to FIG. 2, a vapor holder 10 is shown as a vessel fitted with a flexible membrane or bag 12 to contain a variable volume of vapor. In one embodiment, holder 10 had a volume of 6,000 cubic feet, but different volumes may be used in other embodiments. A source of vapor 14 shown flowing into conduit 16, can fill holder 10. As membrane 12 moves, its position is detected by four position sensors 18, 20, 22 and 24, herein referred to as a storage sensor means. Sensor 18 indicates an excessively high volume of vapor in holder 10 and may alert an operator at a loading station to cease supplying vapor from source 14. Sensor 24 indicates an unusually low level in holder 10 and may indicate a leak, and is therefore considered an alarm. Sensor 20 indicates a modestly high volume in holder 10 and may be used to call for consumption, by starting the engine to be described hereinafter. Sensor 22 indicates a modestly low volume in holder 10 and can signal the above noted engine to stop.

Sensors 18–24 are transducers that respond to a mechanical input by producing electrical outputs, shown applied to a control means 26. Control means 26 is a signal processor that can respond to a variety of input signals to produce various output signals for controlling the system described herein. Preferably, control means 26 is a programmable logic controller, which is a microprocessor-based system having a variety of input and output cards to deal with a variety of analog and digital signals. To this end, control means 26 will include a number of analog to digital and digital to analog converters. Control means 26 may also include timers to produce a delayed response to various inputs. In other embodiments, control means 26 may be a different type of computer, or may be built from discrete logic circuits. Control means 26 is shown with a plurality of other inputs and outputs, indicated as dotted lines. These dotted lines indicate an electrical signal to/from the variety of transducers illustrated in this and other diagrams.

Conduit 16 a shown fitted with an analyzer 28 that can sense its hydrocarbon content. For example, analyzer 28 may include a infrared light source tuned to detect a specific substance such as propane, butane, etc. This analyzer is employed for the purpose of reporting the hydrocarbon content and is not part of a feedback loop.

Conduit 16 a shown feeding a precooler 30, which is part of a condensing means. Precooler 30 is shown with an internal baffle 32 positioned to create a descending upstream path and an ascending downstream path. Refrigerant circulating through coil 34, located in the ascending downstream path, can reduce the temperature at the outlet of precooler 30 to about 35° F., although other temperatures can be established instead. The temperature at the bottom and outlet of precooler 30 can be sensed by sensors 36 and 38, respectively. These sensors 36 and 38 are coupled to the previously mentioned control means 26.

The output of precooler 30 flows through conduit 40 to a finishing condenser 42, which is also part of the condensing means. Condenser 42 also has a baffle 44 to again create a descending upstream path and an ascending downstream path. Refrigerant circulating through coil 46, located in the ascending upstream path, can reduce the temperature at the outlet of condenser 42 to about −40° F., although other temperatures may be employed in alternate embodiments. Temperature at the bottom and outlet of condenser 42 can be sensed by sensors 48 and 50, respectively. Sensors 48 and 50 are coupled to the previously mentioned control means 26. The refrigeration system for providing refrigerant to coils 34 and 46 is conventional and is not specifically described in this diagram.

The condensate falling onto the floors of units 30 and 42 drain through conduits 52 and 54, respectively, to a decanter 56. This condensate initially flows to one side of a weir 58, which allows water to descend and eventually overflow through pipe 60. Lighter hydrocarbon condensate will flow over the weir to the right side of decanter 56. Three sensors 61, 62 and 64 are used to detect whether the level of condensate in decanter 56 is too high, modestly high, or modestly low. Sensor 65 senses the temperature inside the decanter. Sensors 61–65 provide output signals to previously mentioned control means 26.

Condensate from decanter 56 can be pumped by pump 66 to a storage tank (not shown), especially when sensor 61 indicates the condensate level in decanter 56 is excessively high. Pump 66 is controlled by transducer 68, which receives its controlling input from previously mentioned control means 26.

The line 76 has a valve 78 that can be opened to drain into decanter 56 liquid (for example, gasoline) that may have inadvertently spilled into holder 10, Pump 66 can then be used to send this spillage to the storage tank.

Condensate in decanter 56 can also be withdrawn by pump 70, which is controlled by a transducer 72 under the control of control means 26. Pump 70 delivers condensate to spray heads 74, which are also referred to herein as a saturating means. As explained further hereinafter, these spray heads can increase the concentration of fuel leaving finishing condenser 42, when the vapor concentration is inadequate for the purposes to be described presently.

A thermal means is shown herein employing a vessel 80 filled with a medium such as a 60/40 mix of glycol and water. Vessel 80 is fitted with a temperature sensor 82 and a level sensor 84 to send monitoring signals to previously mentioned control means 26. Vessel 80 can be heated by an electrical heater 86, which is controlled by transducer 88, under the influence of control means 26. In one embodiment the medium in vessel 80 was regulated to a temperature of 130° F. At times, vessel 80 will need to be purged by nitrogen gas, which can be admitted through purge valve 90.

The outlet of vessel 80 is drawn by pump 92, which is under the control of transducer 94 and control means 26. Pump 92 delivers heated liquid to heating coil 96 of reheater 98, before returning through line 100 to vessel 80. Reheater 98 is coupled to the outlet of condenser 42 in order to increase the temperature of vapor therefrom before delivery through conduit 99 to the engine to be described hereinafter.

The discharge from pump 92 can also circulate through condenser 42 when defrost valve 102 is opened by transducer 104, under the influence of control means 26. Valve 102 can be programmed to open periodically according to a schedule pre-programmed in control means 26. For example, the defrost cycle can occur daily for about two hours. With valve 102 open, heated liquid can flow through defrost coil 106, located in the descending upstream path of condenser 42. Heated liquid can also flow through the defrost coils 108 mounted at the body of condenser 42 and at its outlet drain 54. As before, coils 106 and 108 drain through line 100 to vessel 80.

The discharge of pump 92 can also flow through defrost valve 110 under the control of transducer 112 and control means 26. When valve 110 is open, heated liquid can flow through coils 114 and 116. Coil 114 can defrost the liquid in decanter 56, while coil 116 can heat the body of decanter 56. Again, both coils 114 and 116 drain along line 100 to vessel 80.

It will be noted by circuit 118 that the liquid of vessel 80 can circulate through another system, which will be described herein as a coolant system.

Figure 3:
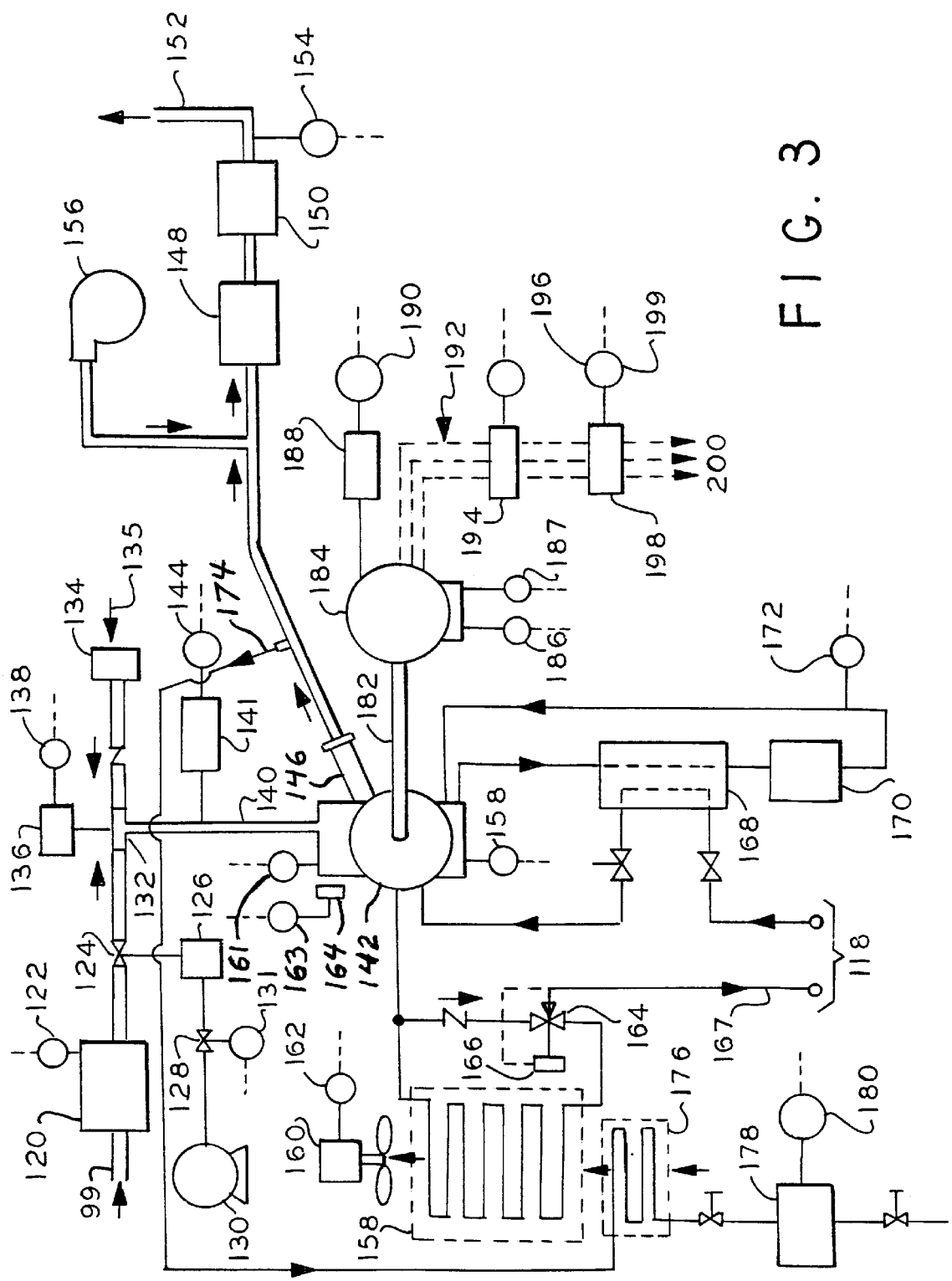
FIG. 3 is a schematic diagram of the engine/generator portion of the system of FIG. 1.

Referring to FIG. 3, previously mentioned conduit 99 is shown connected to detonation arrester 120. Operating parameters of arrester 120 are monitored by transducer 122 which forwards its output to previously mentioned control means 26 (FIG. 2). The output of arrester 120 is coupled to a shut off valve 124, which is operated by actuator 126. Actuator 126 is operated by transducer 131, under the control of the control means 26. Valve 124 is used to shut down the system, not to regulate flow rates.

Shut off valve 124 feeds one inlet of modulating valve 132, whose other inlet draws ambient air through filter 134. The actuator 136 of modulating valve 132 is controlled by transducer 138, under the influence of a control input from previously mentioned control means 26. Actuator 136 is able to change the proportion of flow from the two inlets of modulating valve 132 to adjust the fuel/air ratio in engine intake 140, and thereby act as a fuel adjustment means.

The fuel blend arriving in engine intake 140 is sensed by a fuel sensor means 141. Means 141 employs an infrared sensor that is tuned to measure the butane in intake 140, although other substances can be measured using different sensing means. Control means 26 (FIG. 2) senses the fuel concentration by means of transducer 144 and feeds back a control signal through transducer 138 to control the modulating valve 132. Consequently, the control means can operate to maintain a relatively fixed concentration of fuel in engine intake 140. In a preferred embodiment, the fuel concentration is compared to a target value to produce an error signal, which is integrated over time to produce a feedback signal for controlling the fuel adjustment means 136, 138.

Engine intake 140 connects to the intake manifold of engine 142. Engine 142 may be a naturally aspirated, internal combustion, piston engine, although other engine types may be employed in different embodiments. In one embodiment engine 142 was rated at about 230 horsepower and included a microprocessor-controlled throttle that kept engine speed at at least 1,825 rpm, although other speeds and horsepower ratings are contemplated, depending upon the desired capacity and throughput.

Engine 142 has a number of sensors such as sensor 158 for measuring various operating parameters of engine 142, such as the pressure and temperature of oil and coolant, engine speed, etc. These parameters are sent as signals to previously mentioned control means 26. Transducer 161 is a receiver that relays control signals sent from control means 26 in order to control operating parameters of engine 142, such as engine speed. Sensor 163 connects to a vapor detector 164 to send an alarm to the control means 26 indicating the danger of a fire or explosion due to high vapor concentrations in the engine room.

Engine 142 has an exhaust outlet 146 that delivers its exhaust through spark arrester 148 and muffler 150 before being released through stack 152. The stack temperature is measured by transducer 154, which delivers an output to previously mentioned control means 26. Blower 156 sends ambient air to mix with the exhaust arriving at the inlet to spark arrester 148, and thereby act as a mixing means. Blower 156 will dilute the exhaust to reduce its temperature and thereby reduce the danger of ignition, which can be important in a division 1 explosion proof rated area.

Engine 142 has a coolant system with a coolant outlet that connects to a radiator means, shown herein as radiator 158. Radiator 158 is cooled by an electric fan 160 controlled by transducer 162, in response to signals from the previously mentioned control means 26. Radiator 158 can be bypassed by valve 164 in response to temperature regulator 166, in order to keep the output temperature on line 167 at a regulated value, for example 130° F. Line 167 is shown passing through circuit 118. As previously mentioned, circuit 118 circulates through vessel 80 (FIG. 2).

Coolant returning from circuit 118 passes through one side of heat exchanger 168 before returning to the coolant inlet of engine 142. The other side of exchanger 168 receives oil from an oil outlet of engine 142 in order to cool the oil. Oil leaving exchanger 168 passes through oil filter 170 before returning to an oil inlet of engine 142. Engine oil temperature is measured by transducer 172, which forwards its measurement to the previously mentioned control means 26.

A sample of the exhaust from exhaust outlet 146 is drawn from sampling line 174 and cooled by cooler 176, a radiator positioned next to radiator 158 so both can be cooled by the same fan 160. The cooled exhaust sample from cooler 176 is delivered to an exhaust sensor means 178.

Sensor means 178 can include an infrared sensor tuned to detect a specific hydrocarbon in the exhaust, for example, propane. Sensor means 178 can also include other types of sensors including an oxygen sensor. In one embodiment, sensor means 178 forwarded its measurement through transducer 180 to the previously mentioned control means 26, which acts to shut down engine 142 if the propane level exceeds 10%. Sensor means 178 includes an inlet chamber with internal spiral corrugations to swirl the incoming exhaust and thereby centrifugally remove water droplets.

Sensor means 178 acts as a continuous emission monitoring system (CEMS) for recording emissions from the engine 142. The exhaust signal from transducer 180 is monitored by control means 26 to perform a five-minute average. These five-minute averages are later converted to a one hour average. This data is kept as a record that can be printed out through the control means 26 for the purpose of documenting emissions compliance.

The output shaft 182 of engine 142 drives an induction generator 184. Various operating parameters of the generator 184 (speed, voltage, current, temperature, etc.) can be monitored by transducers such as transducer 186, whose output signal is sent to previously mentioned control means 26. Also, transducer 187 is a receiver that relays control signals from previously mentioned control means 26, in order to control operating parameters of the generator 184. Generator 184 can be rated to deliver 125 kW, at 200 A and 60 Hz, although this rating can vary depending upon the system capacity or other requirements. It is highly desirable to keep the rating of generator 184 such that it will demand only approximately 30% to 40% of the rated horsepower of the engine 142. A phase sequence relay 188 connected to generator 184 performs the conventional phase sequencing under the control of transducer 190 in accordance with signals from the previously mentioned control means 26.

Three phase output power is provided by generator 184 on lines 192 to a switching means 194. Switching means 194 can interrupt lines 192 when the output from generator 184 is low (when the motor is running slowly or stopped), or when a thermal overload is detected. Also, switching means 194 can be switched off under the influence of receiver 196, which is controlled by control means 26. Power transferred through switching means 194 can be measured by power meter 198, whose measurement is sent through transmitter 199 to previously mentioned control means 26.

Figure 1:
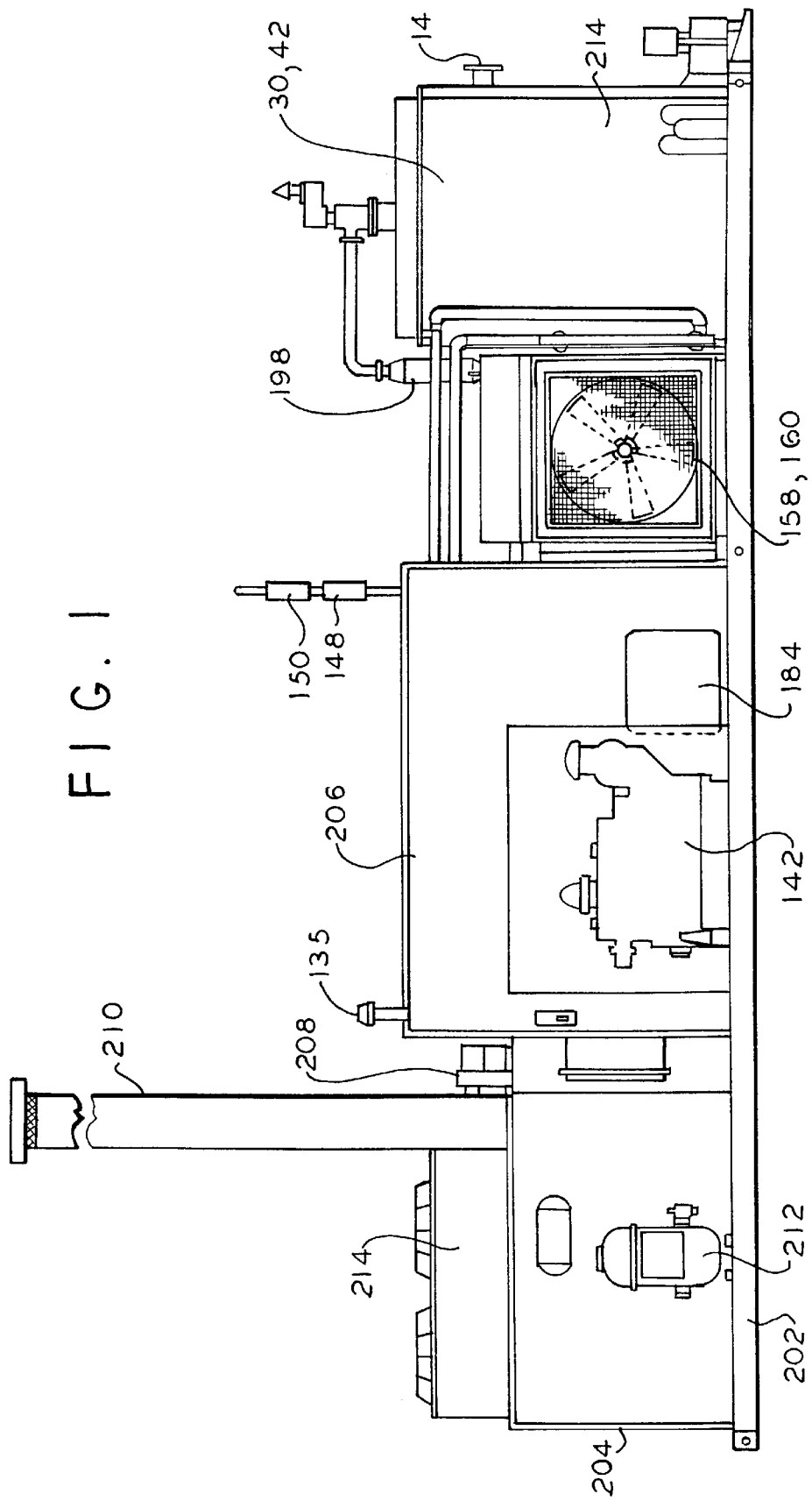
FIG. 1 is an elevational view of a system in accordance with the principles of the present invention.

Referring to FIG. 1, the present system is shown installed atop a pair of lifting beams 202. A first compartment 204 and second compartment 206 are positively pressurized by a fan 208, which draws remote air down through stack 210 for that purpose. Compartment 204 contains a compressor 212 and air cooled condenser 214 that provide refrigerant to the previously mentioned pre-cooler 30 and finishing condenser 42 (FIGS. 1 and 2). Compartment 204 also contains the previously mentioned control means and other electrical equipment.

Compartment 206 contains previously mentioned engine 142 and generator 184. The previously mentioned spark arrester 148 and muffler 150 are shown projecting above compartment 206. The previously mentioned fan/radiator combination 158, 160 is shown mounted between compartment 206 and a third compartment 214. Vapor source inlet 14 is shown feeding into compartment 214, which contains the previously mentioned precooler 30 and finishing condenser 42. The output of finishing condenser 42 is shown connecting to reheater 98.

It will be appreciated that different physical arrangements may be implemented. For example, the various components can be arranged in a different spatial order. Alternatively, the various components can be arranged as separate modules that may be interconnected by appropriate ducts, pipes, lines, etc.

To facilitate an understanding of the principles associated with the foregoing apparatus, its operation will be briefly described. The system illustrated in FIG. 1 can be installed near a source of vapor that feeds inlet 14. This vapor source can be vapors that are displaced when a gasoline tanker truck is filled, or vapors from some other process. Vapors produced in quantity can be stored in vapor holder 10 (FIG. 2), whose membrane 12 rises as the volume of stored vapors increases. As the stored vapors increase, eventually sensor 20 signals control means 26, which then attempts to start engine 142.

First, valve 128 (FIG. 3) is opened to cause transducer 126 to open the shut off valve 124, thus providing a fuel path to engine 142. Engine 142 is cranked for a predetermined amount of time, while engine speed is monitored. If engine speed does not rise to level indicating a start, the cranking ceases and shut off valve 124 is closed again. Control means 26 will repeat this procedure two more times, if necessary.

If the engine does start, a partial vacuum is drawn through engine intake 140, which is communicated through conduit 99, units 30 and 42, and conduit 16, which connects to vapor holder 10. Consequently, vapor is drawn from holder 10, and possibly from vapor source 14 into precooler 30. Refrigerant circulating through coil 34 essentially causes the water vapor present in the vapor stream to condense and drain through pipe 52 to a position behind weir 58 in decanter 56. Since the temperature of vapor leaving through conduit 40 is only about 35° F., the more volatile vapors are not condensed and are instead delivered to finishing condenser 42.

In finishing condenser 42, refrigerant circulating through coil 46 reduces the temperature to about −40° F. to condense the more volatile vapors. These condensed vapors drain through pipe 54 to a position behind weir 58 in decanter 56. Accordingly, decanter 56 has a combination of water and liquid hydrocarbons behind weir 58. Since the water is heavier, it descends and discharges through overflow pipe 60. The incoming liquid hydrocarbons eventually spill over weir 58.

At times, vapor source 14 will result from the displacement caused by the loading of a truck that normally handles such distillates as diesel fuel, home heating oil, kerosene, jet fuel, and other less volatile liquids. In that case, vapor holder 10 will have insufficient combustible vapor for eventually running engine 142. For this reason, pump 70 will normally be activated whenever engine 142 is running. This causes a return of condensed hydrocarbons back to the saturating spray heads 74 in finishing condenser 42. Spray heads 74 will atomize the returning liquid into a fine mist that can be easily combusted by engine 142. In some embodiments pump 70 can be started manually, or when sensor 28 detects a low hydrocarbon vapor content in conduit 16. In cases where a more volatile vapor is being handled (e.g., gasoline vapors) the saturating spray heads 74 may not be used at all.

The liquid medium in vessel 80 has been warmed by regulated electric heater 86, or by the engine coolant flowing through circuit 118. Whenever engine 142 is running, pump 92 also runs to circulate the heated medium in vessel 80 through warming coil 96 of reheater 98. This increases the temperature of the rather cold vapor that would otherwise come from finishing condenser 42. This warming of the output of condenser 42 allows for easier combustion in engine 142.

After passing through flame arrester 120 (FIG. 3), fuel is mixed with air at modulating valve 132. Modulating valve 132 determines the balance between fuel and air, based on the hydrocarbon measurements performed by fuel adjustment sensor 141. Preferably, an infrared sensor in sensor 141 detects the level of butane in conduit 140 and compares that measurement to a target value. The difference from this target value is time integrated in control means 26 (FIG. 2) to produce a feedback signal that is applied through transducer 138 to the actuator 136 of the modulating valve 132.

As the engine warms up, electric fan 160 will eventually be turned on by control means 26 when the temperature of engine 142 rises sufficiently, as measured by one of the transducers, such as transducer 158. Engine coolant is kept at a temperature of 130° F., under the regulation of bypass valve 164. This coolant flow is used to cool oil by circulating through heat exchanger 168. The coolant flow diverted through circuit 118 also works to bring the temperature of the medium in vessel 80 (FIG. 2) to a temperature of about 130° F., without the need for electric heater 86.

The exhaust from engine 142 flows from outlet 146, mixes with cooling air from blower 156, and passes through spark arrester 148 and muffler 150 before being discharged through stack 152.

As engine 142 reaches a speed of at least 1825 rpm, generator 184 may now be able to produce a power output that is sufficient to deliver power to the utility lines 200. If the operating parameters of generator 184, as measured by transducer 186, are favorable, switch means 194 may be closed by means of transducer 196, under the control of control means 26. Once switch means 194 is closed, the power output is measured by power meter 198.

Since generator 184 is an induction generator, its power output can be increased if needed by increasing its speed. When increased speed is needed, control means 26 sends appropriate signals through transducer 161, requesting the microprocessor-controlled throttle of engine 142 to increase the engine speed appropriately. In the preferred design, the throughput of vapor is limited by the capacity of engine 142. Typically, precooler 30 and finishing condenser 42 can deliver more fuel (either as uncondensed vapor or by spraying condensed liquid by means of spray head 74 in condenser 42) than engine 142 can handle without reaching an unacceptably high speed.

Control means 26 has a timer for periodically scheduling a defrost cycle. In some embodiments, defrosting may occur for two hours once every day. When a defrost cycle is initiated, valves 102 and 110 (FIG. 2) are opened by transducers 104 and 112, respectively, under the influence of control means 26. Consequently, pump 92 causes heated medium to flow through coils 106, 108, 114, and 116. As a result, ice that may have formed at condenser 42 or decanter 56 will be melted. At the end of the defrost cycle, valves 102 and 110 will be closed by control means 26.

Since the delivery of vapors from source 14 can be sporadic, storage in vapor holder 10 will allow a more continuous delivery of vapor through conduit 16 into precooler 30. At times however, vapor holder 10 will be depleted to the point that level sensor 22 signals a low condition to control means 26. In response, control means 26 sends a command through a transducer, such as transducer 161, to stop engine 142 (FIG. 3). Also, control means 26 will send a signal through transducer 131 to close valve 128, which causes actuator 126 to close the shut off valve 124 in order to stop the delivery of fuel to engine 142. Shut off valve 124 can also close under emergency conditions. For example, vapor detector 164, or a smoke or fire detector, may produce an alarm signal that closes valve 124 under such conditions.

It is appreciated that various modifications may be implemented with respect to the above described, preferred embodiment. While an internal combustion, piston engine is illustrated, in other embodiments other types of engines may be used, including turbine engines. While vapor condensation is performed in two stages herein, in other embodiments the condensation can be performed in a fewer or greater number of stages. While a specific topology is shown for routing a coolant and heating medium, in other embodiments that topology can be arranged in a variety of ways to include different serial or parallel connections, or to include independent systems. Specifically, in some embodiments the defrosting system can be separate from the engine coolant system. While a weir is shown for separating water, in other embodiments different types of separation systems can be used, including centrifugal separation. A plurality of independent control systems, each using one of a variety of technologies, can be used instead of the single control means disclosed herein. Also, a variety of valves may be used that are controlled in a variety of ways including hydraulically, electrically, pneumatically, etc. Furthermore, a greater or lesser number of operating parameters can be measured in comparison to those measured in this disclosure.

Obviously, many modifications and variations of the present invention are possible in light of the above teachings. It is therefore to be understood that within the scope of the appended claims, the invention may be practiced otherwise than as specifically described.

What is claimed is:

1. A system for recovering and utilizing vapor from a source of vapor, comprising:

a vapor holder for storing a quantity of vapor from said source of vapor;

a condensing means coupled to said vapor holder for receiving and condensing at least partially, vapor from said vapor holder;

an engine having an engine intake coupled to said condensing means and an exhaust outlet, said engine being powered at least partially by output from said condensing means;

a generator driven by said engine for generating electrical power; and a fuel adjustment means having a control input and being coupled between said engine and said condensing means for adjusting fuel concentration into said engine intake in response to a signal on said control input.

2. A system for recovering and utilizing vapor from a source of vapor, comprising:

a vapor holder for storing a quantity of vapor from said source of vapor;

a condensing means coupled to said vapor holder for receiving and condensing at least partially, vapor from said vapor holder;

an engine having an engine intake coupled to said condensing means and an exhaust outlet, said engine being powered at least partially by output from said condensing means;

a generator driven by said engine for generating electrical power;

a storage sensor means coupled to said vapor holder for producing a storage signal signifying volume of vapor stored therein; and a control means coupled to said engine and said storage sensor for starting and stopping said engine, said control means being operable to control the duration of operation of said engine in response to said storage sensor signal.

3. A system according to claim 2 wherein said control means comprises:

a programmable logic controller.

4. A system according to claim 1 comprising:

a detonation arrester serially coupled with said fuel adjustment means for arresting flame propagation.

5. A system according to claim 1 comprising:

a fuel sensor means coupled to said engine intake for sensing concentration of at least some constituents of vapor at said engine intake, and for applying a signal to the control input of said fuel adjustment means corresponding thereto.

6. A system according to claim 1 wherein said fuel adjustment means comprises:

a modulating valve for allowing aspiration of a portion of air in order to adjust the concentration of air into said engine intake.

7. A system according to claim 6 comprising:

mixing means coupled to said exhaust outlet of said engine for mixing air with exhaust.

8. A system according to claim 1 for returning power to a power utility grid, comprising:

switching means coupled between said generator and said utility grid for returning power to said utility grid.

9. A system according to claim 1 wherein said generator is an induction generator.

10. A system according to claim 1 wherein said condensing means comprises:

a precooler for partially condensing vapor from said vapor source; and a finishing condenser coupled to said precooler for cooling uncondensed vapor from said precooler, said finishing condenser operating at a lower temperature than said precooler.

11. A system according to claim 1 comprising:

a decanter coupled to said condensing means for receiving condensate therefrom, said decanter being operable to separate water from the condensate.

12. A system according to claim 11 comprising:

saturating means mounted in said condensing means for spraying some of the condensate from said decanter back into said condensing means.

13. A system according to claim 1 comprising:

a reheater coupled between said condensing means and said engine for warming uncondensed vapor from said condensing means before delivery to said engine.

14. A system according to claim 13 wherein said engine comprises:

a coolant system for circulating a medium through said engine, said medium being circulated to deliver heat to said reheater.

15. A system according to claim 2 comprising:

a shut off valve in said engine intake coupled to said control means for shutting off flow to said engine in response to signals from said control means.

16. A system according to claim 15 wherein said control means is operable to close said shut off valve after a failed attempt to start said engine.

17. A system according to claim 1 wherein said engine comprises:

a coolant system for circulating a medium through said engine, said medium being circulated to deliver heat to said condensing means in order to defrost said condensing means.

18. A system according to claim 1 comprising:

a thermal means having a vessel containing a medium, said engine comprising:

a coolant system for delivering heat to said medium in said vessel.

19. A system according to claim 18 wherein said thermal means is operable to circulate said medium to said condensing means in order to defrost said condensing means.

20. A system according to claim 18 comprising:

a reheater coupled between said condensing means and said engine, said thermal means being operable to circulate said medium to said reheater in order to warm uncondensed vapor from said condensing means before delivery to said engine.

21. A system according to claim 18 comprising:

a decanter coupled to said condensing means for receiving condensate therefrom, said thermal means being operable to circulate said medium to said decanter in order to defrost said decanter.

22. A system according to claim 18 comprising:

an electric heater mounted at said vessel for heating said medium.

23. A system according to claim 18 wherein said coolant system comprises:

a radiator means for regulating said medium to a predetermined temperature.

24. A system according to claim 1 comprising:

a fuel sensor means coupled to said engine intake for sensing concentration of at least some constituents of vapor at said engine intake, and for applying a signal to the control input of said fuel adjustment means corresponding thereto.

25. A system according to claim 24 wherein said fuel sensor means comprises:

an infrared sensor for detecting at least one type of hydrocarbon.

26. A system according to claim 2 comprising:

an exhaust sensor means coupled to said exhaust outlet for providing an exhaust signal signifying concentration of at least some constituents of the exhaust at said exhaust outlet.

27. A system according to claim 26 wherein said control means is operable to stop said engine in response to said exhaust signal crossing a predetermined threshold.

28. A system according to claim 26 wherein said exhaust sensor means comprises:

an infrared sensor for detecting at least one type of hydrocarbon.

29. A system according to claim 26 wherein said control means is operable to average and record said exhaust signal over a predetermined interval.

30. A system according to claim 26 comprising:
a cooler coupled between said exhaust outlet and said exhaust sensor means for cooling exhaust before sensing by said exhaust sensor.

31. A system for recovering and utilizing vapor from a source of vapor, comprising:
a condensing means for receiving and condensing at least partially, vapor from the source of vapor;
an engine having an engine intake coupled to said condensing means, said engine being powered at least partially by output from said condensing means;
a fuel adjustment means having a control input and being coupled between said engine and said condensing means for adjusting fuel concentration into said engine intake in response to a signal on said control input;
a fuel sensor means coupled to said engine intake for sensing concentration of at least some constituents of vapor at said engine intake, and for applying a signal to the control input of said fuel adjustment means corresponding thereto; and
a generator driven by said engine for generating electrical power.

32. A system according to claim 31 wherein said fuel sensor means comprises:
an infrared sensor for detecting at least one type of hydrocarbon.

33. A system for recovering and utilizing vapor from a source of vapor, comprising:
a condensing means for receiving and condensing at least partially, vapor from the source of vapor;
an engine coupled to said condensing means and having an exhaust outlet for conducting exhaust from said engine, said engine being powered at least partially by output from said condensing means;
an exhaust sensor means coupled to said exhaust outlet for providing an exhaust signal signifying concentration of at least some constituents of the exhaust at said exhaust outlet; and
a generator driven by said engine for generating electrical power.

34. A system according to claim 33 wherein said exhaust sensor means is operable to stop said engine in response to said exhaust signal crossing a predetermined threshold.

35. A system according to claim 33 wherein said exhaust sensor means comprises:
an infrared sensor for detecting at least one type of hydrocarbon.

36. A system according to claim 33 wherein said exhaust sensor means is operable to average and record said exhaust signal over a predetermined interval.

37. A system according to claim 33 comprising:
a cooler coupled between said exhaust outlet and said exhaust sensor means for cooling exhaust before sensing by said exhaust sensor.

* * * * *